United States Patent
Gu et al.

(10) Patent No.: US 8,509,243 B2
(45) Date of Patent: Aug. 13, 2013

(54) METHOD AND DEVICE FOR SENDING A PACKET BASED ON TUNNELING PROTOCOL USED IN LAYER 2

(75) Inventors: Rongwei Gu, Shenzhen (CN); Xingguo Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 216 days.

(21) Appl. No.: 12/834,496

(22) Filed: Jul. 12, 2010

(65) Prior Publication Data

US 2010/0278183 A1 Nov. 4, 2010

Related U.S. Application Data

(63) Continuation of application No. PCT/CN2009/070196, filed on Jan. 19, 2009.

(30) Foreign Application Priority Data

Jan. 25, 2008 (CN) .......................... 2008 1 0056872

(51) Int. Cl.
*H04L 12/28* (2006.01)

(52) U.S. Cl.
USPC ............. 370/395.53; 370/395.5; 370/395.51; 370/395.52; 370/400; 370/401

(58) Field of Classification Search
USPC ............. 370/395.5, 395.51, 395.52, 395.53, 370/305.54, 397.7, 400, 401, 410
See application file for complete search history.

(56) References Cited

U.S. PATENT DOCUMENTS

| | | | | |
|---|---|---|---|---|
| 6,188,694 | B1* | 2/2001 | Fine et al. | 370/402 |
| 6,618,388 | B2* | 9/2003 | Yip et al. | 370/401 |
| 7,469,298 | B2* | 12/2008 | Kitada et al. | 709/236 |
| 7,489,700 | B2* | 2/2009 | Oogushi | 370/409 |
| 7,633,956 | B1* | 12/2009 | Parandekar et al. | 370/401 |
| 7,724,688 | B2* | 5/2010 | Yamada et al. | 370/256 |

(Continued)

FOREIGN PATENT DOCUMENTS

| | | |
|---|---|---|
| CN | 101022394 A | 8/2007 |
| CN | 101110847 A | 1/2008 |

(Continued)

OTHER PUBLICATIONS

Gongye, Z., et al., "A Design of a Transparent Gateway," Computer Engineering, vol. 30, No. 11, Jun. 2004, 3 pages (abstract only), China Academic Journal Electronic Publishing House.

(Continued)

*Primary Examiner* — Andrew Lai
*Assistant Examiner* — Andrew C Lee
(74) *Attorney, Agent, or Firm* — Slater & Matsil LLP

(57) ABSTRACT

A method and a device for sending a packet based on Tunneling Protocol used in Layer 2 are provided. Specifically, when a traffic flow needs to be sent from a network side to a client via QinQ termination equipment in which the tunneling protocol used in Layer 2 is used, forwarding address information corresponding to the client is obtained by searching a Dynamic Host Configuration Protocol (DHCP) snooping binding table according to Internet Protocol (IP) address information of the client in a packet of the traffic flow. The packet of the traffic flow can be sent to the client according to the obtained forwarding address information.

11 Claims, 2 Drawing Sheets

(56) References Cited

U.S. PATENT DOCUMENTS

| | | | |
|---|---|---|---|
| 7,835,370 B2* | 11/2010 | Sajassi | 370/401 |
| 7,876,704 B1* | 1/2011 | Bims et al. | 370/254 |
| 7,889,728 B2* | 2/2011 | Arad et al. | 370/389 |
| 8,116,308 B2* | 2/2012 | Ellis et al. | 370/389 |
| 2002/0009078 A1* | 1/2002 | Wilson et al. | 370/389 |
| 2003/0152075 A1* | 8/2003 | Hawthorne et al. | 370/389 |
| 2004/0165581 A1* | 8/2004 | Oogushi | 370/352 |
| 2004/0165600 A1* | 8/2004 | Lee | 370/395.53 |
| 2004/0249960 A1* | 12/2004 | Hardy et al. | 709/229 |
| 2005/0063397 A1* | 3/2005 | Wu et al. | 370/401 |
| 2005/0243837 A1* | 11/2005 | Boyd et al. | 370/395.52 |
| 2006/0047851 A1* | 3/2006 | Voit et al. | 709/239 |
| 2006/0245438 A1* | 11/2006 | Sajassi et al. | 370/399 |
| 2006/0245439 A1* | 11/2006 | Sajassi | 370/400 |
| 2006/0248229 A1* | 11/2006 | Saunderson et al. | 709/245 |
| 2007/0076719 A1* | 4/2007 | Allan et al. | 370/392 |
| 2007/0121617 A1* | 5/2007 | Kanekar et al. | 370/389 |
| 2007/0127461 A1* | 6/2007 | Yamada et al. | 370/389 |
| 2007/0171918 A1* | 7/2007 | Ota et al. | 370/395.53 |
| 2007/0237159 A1* | 10/2007 | Yamada et al. | 370/395.53 |
| 2008/0123604 A1 | 5/2008 | Shimizu | |
| 2008/0275972 A1* | 11/2008 | Ellis et al. | 709/223 |
| 2009/0141703 A1* | 6/2009 | Ghodrat et al. | 370/352 |
| 2009/0154470 A1* | 6/2009 | Kuc | 370/395.53 |
| 2009/0157901 A1* | 6/2009 | Asati et al. | 709/238 |
| 2010/0020738 A1* | 1/2010 | Inouchi et al. | 370/315 |
| 2010/0238813 A1* | 9/2010 | Allan et al. | 370/252 |

FOREIGN PATENT DOCUMENTS

| | | |
|---|---|---|
| CN | 101227407 A | 7/2008 |
| EP | 1 798 908 A1 | 6/2007 |
| WO | WO 2007/064744 A2 | 6/2007 |

OTHER PUBLICATIONS

Yan, M., et al., "Research on Web/Portal Authentication Technology," Journal of Microelectronics & Computers, Aug. 21, 2004, 4 pages (abstract only).

Xiu-Juan, D., "Management the Security of IP address in the Campus Network," Journal of Qinghai Normal University of Natural Science, vol. 1, No. 1, 2007, 3 pages (abstract only).

Ming-Chuan, Y., "Applying a Huawei Switch for Preventing ARP Cheating," Modern Computer, Feb. 2007, 3 pages (abstract only), China Academic Journal Electronic Publishing House.

Written Opinion of the International Searching Authority, International Application No. PCT/CN2009/070196, Applicant: Huawei Technologies Co., Ltd., et al., Date of mailing: Apr. 30, 2009, 8 pages.

Chinese Office Action, Chinese Application No. 200810056872.4, Date of mailing: Oct. 9, 2010, 15 pages.

Supplementary European Search Report, European Application No. 09705791.3-2416, Applicant: Huawei Technologies Co., Ltd., Dated: Nov. 9, 2010, 7 pages.

Ling, Wang, et al., "Realization and Testing of 802.1 Qin Q," Electronic Measurement Technology, Sep. 2007, pp. 96-99.

Chinese Office Action, Application No. 2008100568724, dates Feb. 12, 2010, 15 pages.

"IEEE Standard for Local and metropolitan area networks; Virtual Bridged Local Area Networks," IEEE Std 802.1Q-2005, IEEE Computer Society, May 19, 2006, 302 pages.

Huawei Technologies Co., Ltd., "Technical White Paper for QinQ," 2007, 33 pages.

International Search Report, International application No. PCT/CN2009/070196, Date of mailing of the international search report Apr. 30, 2009, 4 pages.

* cited by examiner

METHOD AND DEVICE FOR SENDING A PACKET BASED ON TUNNELING PROTOCOL USED IN LAYER 2

This application is a continuation of co-pending International Application No. PCT/CN2009/070196, filed on Jan. 19, 2009, which did not designated the United States and was not published in English, and which claims priority to Chinese Application No. 200810056872.4, filed on Jan. 25, 2008, both of which applications are incorporated herein by reference.

TECHNICAL FIELD

The present invention relates to the field of network communications technologies, and more particularly to a method and a device for sending a packet based on Tunneling Protocol used in Layer 2.

BACKGROUND

The QinQ protocol is a tunneling protocol used in Layer 2 based on the IEEE 802.1Q technology, and is a technology for extending the space of Virtual Local Area Network (VLAN). Specifically, an additional layer of 802.1Q tag header is added to 802.1Q tagged packet. As the packet transmitted based on this technology in a backbone network has two layers of 802.1Q tag headers (one for public network, and the other for private network), the technical protocol is referred to as the QinQ protocol, that is, the 802.1Q-in-802.1Q protocol.

Currently, a network termination equipment based on the QinQ protocol acts as an access point, the packet encapsulated with two layers of VLAN tags is received, the two layers of the VLAN tags are both stripped, and the packet is forwarded. The network termination equipment based on the QinQ protocol herein is network equipment containing a QinQ termination interface, which is also referred to as QinQ termination equipment. When a traffic flow is sent from the network side to a client side via the QinQ termination interface, a Media Access Control (MAC) address and two layers of VLAN tags of the client are obtained by searching for an Address Resolution Protocol (ARP) entry of the client in an ARP table according to an Internet Protocol (IP) address of the packet of the traffic flow at the QinQ termination interface. Then, the obtained MAC address and the two layers of VLAN tags are encapsulated, and the packet is forwarded to the client. If no corresponding ARP entry is found, the ARP entry is obtained through active learning and the ARP table is updated.

FIG. 1 is a schematic structural view of a network based on the QinQ protocol. As shown in FIG. 1, Router1 is a QinQ termination interface; Switch1 encapsulates a first layer of VLAN tag to the packet; and Switch2 and Switch3 encapsulate a second layer of VLAN tag to the packet. When a traffic flow needs to be sent from a network side (Internet) to Client1 at a client side via the QinQ termination interface, if an ARP entry corresponding to Client1 is found in Router1, an MAC address and two layers of VLAN tags corresponding to Client1 are encapsulated directly, and the packet of the traffic flow are sent. The packet of the traffic flow can be sent to Client1 after being processed by Switch1 and Switch2.

However, if no ARP entry corresponding to Client1 is found in Router1, Router1 needs to actively send an ARP request for learning and obtaining the ARP entry of Client1. As the two layers of VLAN tag information of Client1 cannot be obtained, the QinQ termination interface needs to be traversed, that is, the ARP request needs to be sent to all the VLAN tags which are configured on the QinQ termination interface so as to ensure Client1 to receive the ARP request. After receiving the ARP request, Client1 returns a response, and Router1 can learn the related ARP entry according to the response from Client1.

In the implementation of the present invention, the inventors found that the above technical solution has the following problems. Since the two layers of VLAN tag information cannot be obtained, ARP request needs to be sent by traversing all the VLAN tags which are configured on the QinQ termination interface. If the number of the configured VLAN tags is large, plenty of ARP requests need to be sent, and this results in blockage in the network channel. Moreover, only one set of the two layers of VLAN tags is corresponding to the client, that is to say, only one of the large number of sent ARP packets is valid, while the others are junk packets, and this results in a great waste of network resources. In addition, if the performance of the switches which are connected to the Router 1 is poor, the sending of a large number of ARP packets is almost equal to an attack on the network equipment, which may cause breakdown of the network equipment and affect the normal operation of the entire network.

SUMMARY OF THE INVENTION

The embodiments of the present invention provide a method and a device for sending a packet based on tunneling protocol used in Layer 2, which can prevent blockage in the network channel save network resources, reduce the load of switching equipment, and improve the network operation quality.

In an embodiment of the present invention, a method for sending a packet based on tunneling protocol used in Layer 2 is provided. When a traffic flow needs to be sent from a network side to a client via QinQ termination equipment in which tunneling protocol used in Layer 2 is used, forwarding address information corresponding to the client is obtained by searching a Dynamic Host Configuration Protocol (DHCP) snooping binding table according to Internet Protocol (IP) address information of the client in a packet of the traffic flow. The packet of the traffic flow is sent to the client according to the obtained forwarding address information.

In another embodiment of the present invention, a device for sending a packet based on L2TP is provided. This device includes a forwarding address information obtaining unit and a packet sending unit.

The forwarding address information obtaining unit is configured to obtain forwarding address information corresponding to a client by searching a Dynamic Host Configuration Protocol (DHCP) snooping binding table according to Internet Protocol (IP) address information of the client in a packet of a traffic flow when the traffic flow needs to be sent from a network side to the client via QinQ termination equipment in which tunneling protocol used in Layer 2 is used.

The packet sending unit is configured to send the packet of the traffic flow to the client according to the obtained forwarding address information.

As can be seen from the above technical solutions, when a traffic flow needs to be sent from a network side to a client via QinQ termination equipment in which tunneling protocol used in Layer 2 is used, searching a DHCP binding table according to IP address of the client in a packet of the traffic flow, obtaining forwarding address information corresponding to the client. Therefore, ARP requests do not need to be sent by traversing all VLAN tags which are configured on the QinQ termination interface by the QinQ termination equipment. The packet of the traffic flow can be sent to the client according to the obtained forwarding address information. Therefore, blockage in the network channel caused by sending a large number of ARP packets is prevented, and network resources are saved. Meanwhile, the operation load of connected switching equipment is effectively reduced, and the network operation quality is improved.

DETAILED DESCRIPTION OF ILLUSTRATIVE EMBODIMENTS

In the embodiments of the present invention, a method and a device for sending a packet based on tunneling protocol used in Layer 2 are provided. When a traffic flow needs to be sent from a network side to a client via QinQ termination equipment, two layers of VLAN tag information corresponding to the client may be obtained according to information in a DHCP snooping binding table. The QinQ termination equipment herein may be network equipment containing a QinQ termination interface, such as a router or a switch with QinQ termination function, which hereinafter is referred to as the QinQ termination interface. ARP requests are encapsulated and sent to the client to implement ARP entry learning according to the two layers of VLAN tags, instead of traversing all VLAN tags which are configured on the QinQ termination interface. Therefore, blockage in the network channel caused by sending a large number of ARP packets is prevented, and network resources are saved. Meanwhile, the operation load of connected switching equipment is effectively reduced, and the network operation quality is improved.

The DHCP snooping technology in the above descriptions is a kind of DHCP security characteristic, which can filter distrusted DHCP message and build and maintain a DHCP snooping binding table. The binding table includes the MAC address, IP address, lease time, binding type, VLAN tag information, interface information, and other entries.

Figure 1:
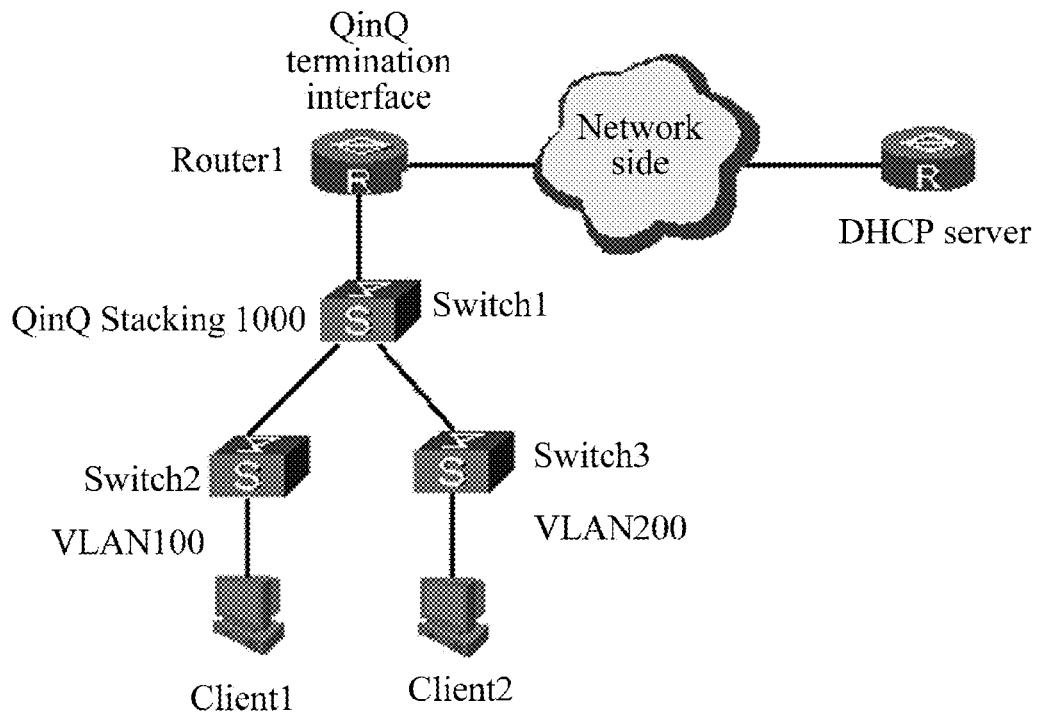
FIG. 1 is a schematic structural view of a network based on the QinQ protocol in the prior art.
Figure 2:
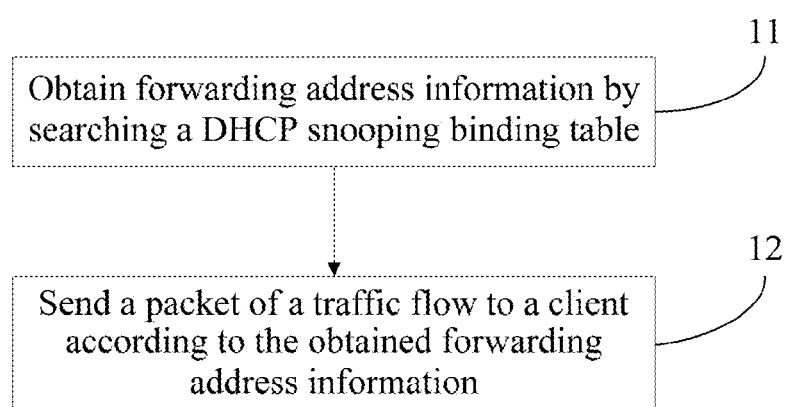
FIG. 2 is a schematic flow chart of a method according to an embodiment of the present invention.

In an embodiment of the present invention, a method for sending a packet based on tunneling protocol used in Layer 2 is provided. FIG. 2 is a schematic flow chart of the method, which includes the following blocks.

In block 11, forwarding address information is obtained by searching a DHCP snooping binding table.

Specifically, when a traffic flow needs to be sent from a network side to a client via a QinQ termination interface, the forwarding address information corresponding to the client is obtained by searching the DHCP snooping binding table according to IP address of the client in a packet of the traffic flow.

The DHCP scooping binding table may be generated through static configuration or dynamic learning. Taking the dynamic learning as an example, the following method may be performed. Firstly, the client, acting as a dynamic client, applies to a DHCP server for an IP address by sending a DHCP packet. A DHCP snooping protocol is enabled at the QinQ termination interface, and a DHCP scooping binding table is generated according to content of the DHCP packet communicated between the client side and the DHCP server. The entries in the DHCP snooping binding table may include the IP address and the MAC address information of the client and the two layers of VLAN tag information corresponding to the client, and may further include other information, such as lease time, binding type, and interface information.

The forwarding address information corresponding to the client may be the two layers of VLAN tag information of the client. Alternatively, the forwarding address information may also be the MAC address information and the two layers of VLAN tag information of the client. The subsequent forwarding operation varies with different obtained forwarding address information.

In block 12, the packet of the traffic flow is sent to the client according to the obtained forwarding address information.

Specifically, after obtaining the forwarding address information corresponding to the client, the packet of the traffic flow is encapsulated and sent to the client according to the forwarding address information, thus the packet forwarding process is implemented.

The packet forwarding process varies with different obtained forwarding address information. If the two layers of VLAN tag information of the client are obtained, an ARP packet is encapsulated and sent to the client according to the obtained two layers of VLAN tag information and the IP address of the client, so as to implement ARP entry learning and obtain the MAC address of the client. After the MAC address of the client is obtained, the packet of the traffic flow is encapsulated and sent to the client according to the MAC address and the two layers of VLAN tag information of the client, thus the packet forwarding process is implemented.

As can be seen from the above solution, since the two layers of VLAN tag information of the client can be obtained, the ARP requests do not need to be sent by traversing all the VLAN tags which are configured on the QinQ termination interface. Instead, the MAC address information of the client can be learned by sending an ARP request, and then a related ARP entry is generated. Therefore, blockage in the network channel caused by sending a large number of ARP packets is prevented, and network resources are saved. Meanwhile, the operation load of connected switching equipment is effectively reduced, and the network operation quality is improved.

Alternatively, if the MAC address information and the two layers of VLAN tag information of the client are obtained, the packet of the traffic flow is encapsulated and sent to the client according to the obtained MAC address information and the two layers of VLAN tag information of the client, and thus the packet forwarding process is implemented. An ARP entry may be generated for subsequent packet forwarding according to the obtained MAC address information and the two layers of VLAN tag information of the client. Alternatively, the ARP entry may not be generated, and the subsequent packet sending may be implemented by searching the DHCP snooping binding table. Likewise, through the implementation of the above technical solution, blockage in the network channel caused by sending a large number of ARP packets is prevented, and network resources are saved. Meanwhile, the operation load of connected switching equipment is effectively reduced, and the network operation quality is improved.

As can be seen from the above two processes, the previous process which involves sending an ARP request may also be employed to update the ARP entry of the client, that is, after receiving the ARP request, the client may learn the IP address of the QinQ termination interface, so as to implement ARP learning and update the ARP entry of the client. Therefore, when packets are forwarded next time, the client may perform corresponding processing according to the ARP table of the client, and thus network resources are saved and the processing efficiency is improved.

Figure 3:
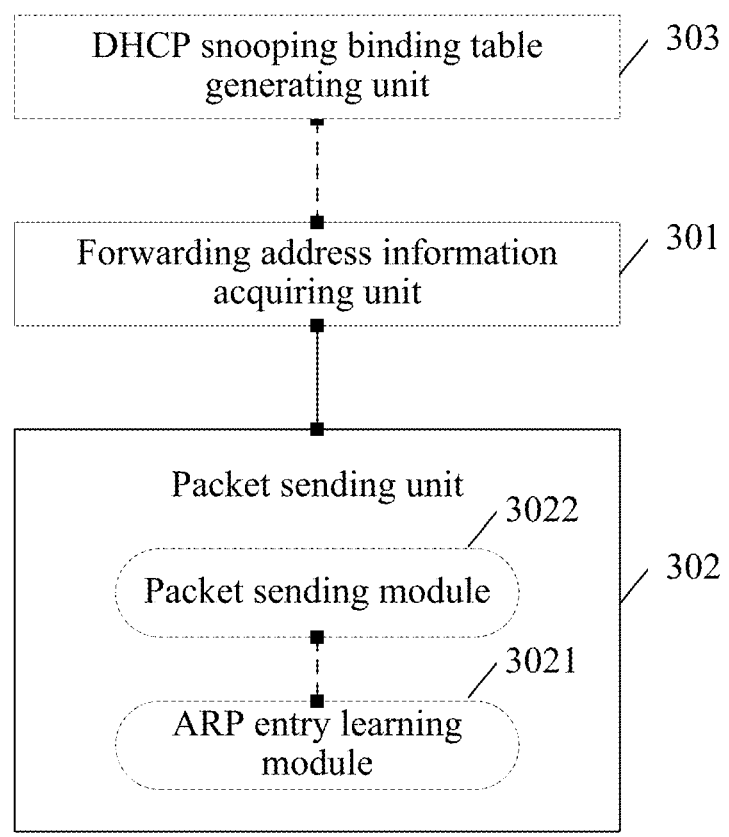
FIG. 3 is a schematic structural view of a device according to another embodiment of the present invention.

In another embodiment of the present invention, a device for sending a packet based on tunneling protocol used in Layer 2 is provided. FIG. 3 is a schematic structural view of the device, which includes a forwarding address information obtaining unit 301 and a packet sending unit 302.

The forwarding address information obtaining unit 301 is configured to obtain forwarding address information by searching a DHCP snooping binding table according to IP address of a client.

Specifically, when a traffic flow needs to be sent from a network side to the client via QinQ termination equipment in which tunneling protocol used in Layer 2 is used, the forwarding address information obtaining unit 301 obtains forwarding address information corresponding to the client by searching the DHCP snooping binding table according to IP address of the client in a packet of the traffic flow.

The packet sending unit 302 is configured to send the packet of the traffic flow to the client according to the obtained forwarding address information. The processes vary with different obtained forwarding address information, which may be similar to the processes described in the above embodiment of the method.

If the obtained forwarding address information is the two layers of VLAN tag information of the client, the packet sending unit 302 includes an ARP entry learning module 3021 and a packet sending module 3022.

The ARP entry learning module 3021 is configured to obtain the MAC address information of the client by encapsulating and sending an ARP packet to the client to implement ARP entry learning according to the obtained two layers of VLAN tag information and the IP address of the client.

The packet sending module 3022 is configured to send the packet of the traffic flow to the client according to the obtained MAC address information and the two layers of VLAN tag information of the client.

If the obtained forwarding address information is the MAC address information and the two layers of VLAN tag information of the client, the packet sending unit 302 includes the packet sending module 3022. The packet sending module 3022 is configured to send the packet of the traffic flow to the client according to the MAC address information and the two layers of VLAN tag information of the client.

The device may further includes a DHCP snooping binding table generating unit 303, configured to generate a DHCP snooping binding table according to content of DHCP packet communicated between the client and a DHCP server.

Specifically, the client, acting as a dynamic client, firstly applies to the DHCP server for an IP address by sending a DHCP packet. The DHCP snooping binding table generating unit 303 is configured to enable a DHCP snooping protocol at the QinQ termination interface, and generate the DHCP snooping binding table according to the content of the DHCP packet communicated between the client and the DHCP server. The generation herein may be implemented through static configuration or dynamic learning. The entries in the DHCP snooping binding table may include the IP address and the MAC address information of the client and the two layers of VLAN tag information corresponding to the client.

The device described above may be deployed at a QinQ termination equipment or deployed as an independent functional entity. The QinQ termination equipment may be network equipment containing a QinQ termination interface, such as a router or a switch with QinQ termination function.

It should be noted that, in the above embodiment of the device, the units are divided according to functional logic, but are not limited to the above division as long as they can implement corresponding functions. In addition, the specific name of each functional unit is used for distinguishing, instead of limiting the protection scope of the present invention.

Furthermore, it should be understood by a person skilled in the art that all or a part of the blocks of the method provided in the embodiments of the present invention may be implemented by a program instructing relevant hardware. For example, the blocks can be implemented by the operation of a computer. The program may be stored in a readable storage medium, such as a random access memory (RAM), a magnetic disk, or a compact disk.

In view of the above, through the implementation of the embodiments of the present invention, blockage in the network channel caused by sending a large number of ARP packets is prevented, and network resources are saved; meanwhile, the operation load of connected switching equipment is effectively reduced, and the network operation quality is improved.

The above descriptions are merely some exemplary embodiments of the present invention, but not intended to limit the scope of the present invention. Any modification, equivalent replacement, or improvement made without departing from the principle of the present invention should fall within the scope of the present invention. Therefore, the protection scope of the present invention is subject to the appended claims.

What is claimed is:

1. A method for sending a packet based on tunneling protocol used in Layer 2, the method comprising:

enabling an a Dynamic Host Configuration Protocol (DHCP) snooping protocol at a QinQ termination interface to generate a DHCP snooping binding table when a client applies to a DHCP server for an Internet Protocol (IP) address;

searching the DHCP snooping binding table according to IP address of the client in a packet of a traffic flow to obtain forwarding address information corresponding to the client when the traffic flow needs to be sent from a network side to the client via a QinQ termination equipment in which tunneling protocol used in Layer 2 is used;

encapsulating the packet of the traffic flow using the forwarding address information corresponding to the client; and sending the packet of the traffic flow to the client according to the obtained forwarding address information;

wherein the forwarding address information corresponding to the client comprises two layers of Virtual Local Area Network (VLAN) tag information of the client.

2. The method according to claim 1, wherein sending the packet of the traffic flow to the client according to the obtained forwarding address information comprises:

implementing ARP entry learning and obtaining Media Access Control (MAC) address information of the client by sending an Address Resolution Protocol (ARP) packet to the client according to the obtained two layers of VLAN tag information and IP address information of the client; and sending the packet of the traffic flow to the client according to the MAC address information and the two layers of VLAN tag information of the client.

3. The method according to claim 1, wherein the forwarding address information corresponding to the client further comprises MAC address information of the client.

4. The method according to claim 3, wherein sending the packet of the traffic flow comprises sending the packet of the traffic flow to the client according to the obtained MAC address information and the two layers of VLAN tag information of the client.

5. The method according to claim 1, wherein the QinQ termination equipment comprises a router.

6. The method according to claim 1, wherein the QinQ termination equipment comprises a switch.

7. A device for sending a packet based on tunneling protocol used in Layer 2, the device comprising:
- a Dynamic Host Configuration Protocol (DHCP) snooping binding table generating unit configured to enable an a DHCP snooping protocol at a QinQ termination interface to generate a DHCP snooping binding table when a client applies to a DHCP server for an Internet Protocol (IP) address;
- a forwarding address information obtaining unit configured to search the DHCP snooping binding table according to IP address information of the client in a packet of a traffic flow to obtain forwarding address information corresponding to the client and to encapsulate the packet of the traffic flow using the forwarding address information corresponding to the client when traffic flow needs to be sent from a network side to the client via QinQ termination equipment in which tunneling protocol used in Layer 2 is used; and
- a packet sending unit configured to send the packet of the traffic flow to the client according to the obtained forwarding address information;
- wherein the forwarding address information corresponding to the client comprises two layers of Virtual Local Area Network (VLAN) tag information of the client.

8. The device according to claim 7, wherein the packet sending unit comprises:
- an Address Resolution Protocol (ARP) entry learning module configured to implement ARP entry learning and obtain Media Access Control (MAC) address information of the client by sending an ARP packet to the client according to the two layers of VLAN tag information and IP address information of the client; and
- a packet sending module configured to send the packet of the traffic flow to the client according to the MAC address information and the two layers of VLAN tag information of the client.

9. The device according to claim 7, wherein when the obtained forwarding address information further comprises MAC address information of the client, the packet sending unit comprises:
- a packet sending module configured to send the packet of the traffic flow to the client according to the MAC address information and the two layers of VLAN tag information of the client.

10. The device according to claim 7, wherein the device is deployed at the QinQ termination equipment.

11. The device according to claim 7, wherein the device is deployed as an independent functional entity.

* * * * *